US009805839B2

(12) United States Patent
Mashima et al.

(10) Patent No.: US 9,805,839 B2
(45) Date of Patent: Oct. 31, 2017

(54) RESISTIVE COMPOSITION

(71) Applicant: Shoei Chemical Inc., Shinjuku-ku, Tokyo (JP)

(72) Inventors: Hiroshi Mashima, Tosu (JP); Yukari Morofuji, Tosu (JP)

(73) Assignee: SHOEI CHEMICAL INC., Shinjuku-ku, Tokyo (JP)

( * ) Notice: Subject to any disclaimer, the term of this patent is extended or adjusted under 35 U.S.C. 154(b) by 0 days.

(21) Appl. No.: 15/119,637

(22) PCT Filed: Aug. 20, 2015

(86) PCT No.: PCT/JP2015/073357
§ 371 (c)(1),
(2) Date: Aug. 17, 2016

(87) PCT Pub. No.: WO2016/039107
PCT Pub. Date: Mar. 17, 2016

(65) Prior Publication Data
US 2017/0062091 A1 Mar. 2, 2017

(30) Foreign Application Priority Data
Sep. 12, 2014 (JP) ................................. 2014-185799

(51) Int. Cl.
*H01B 1/20* (2006.01)
*C03C 8/02* (2006.01)
(Continued)

(52) U.S. Cl.
CPC ............... *H01B 1/20* (2013.01); *C03C 3/066* (2013.01); *C03C 3/074* (2013.01); *C03C 3/087* (2013.01);
(Continued)

(58) Field of Classification Search
CPC . C03C 2204/00; C03C 2205/00; C03C 3/068; C03C 3/072; C03C 3/074;
(Continued)

(56) References Cited

U.S. PATENT DOCUMENTS 3,776,772 A * 12/1973 Asada ................ H01C 17/0654
252/512
5,491,118 A 2/1996 Hormadaly
(Continued)

FOREIGN PATENT DOCUMENTS

| CN | 101990522 A | 3/2011 |
| CN | 101990689 A | 3/2011 |

(Continued)

OTHER PUBLICATIONS

International Search Report for PCT/JP2015/073357 (2 pgs.).
(Continued)

*Primary Examiner* — Mark Kopec
*Assistant Examiner* — Jaison P Thomas
(74) *Attorney, Agent, or Firm* — Flynn, Thiel, Boutell & Tanis, P.C.

(57) ABSTRACT

An object of the present invention is to provide a resistive composition that can form a thick film resistor excluding a toxic lead component from a conductive component and glass and having characteristics equivalent to or superior to conventional resistors in terms of, in a wide resistance range, resistance values, TCR characteristics, current noise characteristics, withstand voltage characteristics and the like. The resistive composition of the present invention includes: ruthenium-based conductive particles including ruthenium dioxide; a glass frit that is essentially free of a lead component; and an organic vehicle, wherein the glass frit is a glass frit which is constituted such that in a case where a fired product of a mixture of the glass frit and the ruthenium
(Continued)

dioxide has in a range of 1 kΩ/□ to 1 MΩ/□, the fired product exhibits a temperature coefficient of resistance in a plus range.

10 Claims, 2 Drawing Sheets

(51) Int. Cl.
| | |
|---|---|
| *C03C 8/04* | (2006.01) |
| *C03C 8/10* | (2006.01) |
| *C03C 8/16* | (2006.01) |
| *C09D 5/24* | (2006.01) |
| *H01C 7/00* | (2006.01) |
| *C03C 3/066* | (2006.01) |
| *C03C 3/074* | (2006.01) |
| *C03C 3/087* | (2006.01) |
| *C03C 3/089* | (2006.01) |
| *C03C 3/091* | (2006.01) |
| *C03C 14/00* | (2006.01) |

(52) U.S. Cl.
CPC .............. *C03C 3/089* (2013.01); *C03C 3/091* (2013.01); *C03C 8/02* (2013.01); *C03C 8/04* (2013.01); *C03C 8/10* (2013.01); *C03C 8/16* (2013.01); *C03C 14/004* (2013.01); *C03C 14/006* (2013.01); *C09D 5/24* (2013.01); *H01C 7/003* (2013.01); *C03C 2214/04* (2013.01); *C03C 2214/16* (2013.01); *C03C 2214/30* (2013.01)

(58) Field of Classification Search
CPC ......... C03C 3/085; C03C 3/087; C03C 3/089; C03C 3/091; C03C 3/093; C03C 3/105; C03C 3/108; C03C 4/14; C03C 8/02; C03C 8/04; C03C 8/10; C03C 8/18; C03C 8/22; C03C 14/004; C03C 14/006; C03C 2214/04; C03C 2214/16; C03C 2214/30; C03C 3/066; C03C 8/16; C09D 11/03; C09D 11/52; C09D 5/24; H01C 17/06533; H01C 7/00; H01C 7/003; H01C 7/023; H01B 1/20
See application file for complete search history.

(56) References Cited

U.S. PATENT DOCUMENTS

| | | | |
|---|---|---|---|
| 6,544,654 B1* | 4/2003 | Fukaya | .................... C03C 3/089 428/432 |
| 7,282,163 B2 | 10/2007 | Tanaka et al. | |
| 7,476,342 B2* | 1/2009 | Endo | ...................... H01C 7/003 252/518.1 |
| 7,481,953 B2 | 1/2009 | Tanaka et al. | |
| 2006/0043345 A1 | 3/2006 | Tanaka et al. | |
| 2006/0052229 A1 | 3/2006 | Tanaka et al. | |
| 2007/0075301 A1 | 4/2007 | Endo et al. | |
| 2009/0261941 A1* | 10/2009 | Hang | ................. H01C 17/0654 338/308 |
| 2011/0089381 A1 | 4/2011 | Labranche et al. | |
| 2013/0344342 A1* | 12/2013 | Ogata | ...................... H01B 1/22 428/426 |

FOREIGN PATENT DOCUMENTS

| | | |
|---|---|---|
| JP | H08-253342 A | 10/1996 |
| JP | 2001-196201 A | 7/2001 |
| JP | 2005-129806 A | 5/2005 |
| JP | 2007-103594 A | 4/2007 |
| JP | 2011-518104 A | 6/2011 |
| JP | 2011-523489 A | 8/2011 |
| TW | 200419593 A | 10/2004 |
| TW | 200612443 A | 4/2006 |
| TW | 200710882 A | 3/2007 |
| TW | 201110159 A1 | 3/2011 |
| TW | 201213269 A1 | 4/2012 |

OTHER PUBLICATIONS

Search Report of Taiwan Patent Office issued in Application No. 104129101 including an English-language Concise Explanation of Relevance, dated Dec. 14, 2016 (6 pages).

Search Report attached to a Chinese Patent Office's Notification dated Mar. 3, 2017 in Chinese Patent Application No. 201580015285.9 (6 pgs).

* cited by examiner

RESISTIVE COMPOSITION

TECHNICAL FIELD

The present invention relates to a resistive composition essentially containing no lead component, especially resistive composition used for forming thick film resistors in various resistor parts, such as a chip resistor, a semi-fixed resistor, a variable resistor, a focus resistor, and a surge element, a thick film circuit, a multilayer circuit board, various multilayer composite parts, and the like.

BACKGROUND ART

A resistive composition mainly contains a conductive component and glass and is used for forming a thick film resistor (hereinafter also merely referred to as a resistor) on various insulating substrates. The resistive composition usually in a form of a paste or paint is printed on an alumina substrate in which electrodes are formed or on a ceramic composite part, and the like to have a predetermined shape and is then fired at a high temperature of 600° C. to 900° C. Thereafter, a protective coating is formed by an overcoat glass if necessary, and then a resistance value is adjusted by laser trimming or the like if necessary.

The characteristics of the resistor to be required are a small temperature coefficient of resistance (TCR), a small current noise, favorable withstand voltage characteristics, favorable process stability (for example, a small change in resistance value by a variation in process), and the like.

Conventionally, a resistive composition using, as a conductive component, ruthenium-based oxide powder (hereinafter also referred to as a ruthenium-based resistive composition) has been generally used widely. This ruthenium-based resistive composition can be fired in air, and by changing the ratio between the conductive component and the glass, resistors having a wide range of resistance value can be easily obtained.

As the conductive component of the ruthenium-based resistive composition, ruthenium dioxide (hereinafter also referred to as ruthenium(IV) oxide); ruthenium composite oxides, such as bismuth ruthenate, lead ruthenate or the like having a pyrochlore structure, barium ruthenate, calcium ruthenate or the like having a perovskite structure; or ruthenium precursors such as ruthenium resinate or the like are used. Especially, in a resistive composition having a high content of glass in a high resistance range, the above-mentioned ruthenium composite oxides such as bismuth ruthenate or the like are preferably used rather than ruthenium dioxide. This is because the resistivity of the ruthenium composite oxides is generally higher by an order of magnitude or more, compared with ruthenium dioxide, and a larger amount of ruthenium composite oxides can be blended compared with ruthenium dioxide, and thus, a variation in resistance value is small, current noise characteristics and resistance characteristics such as TCR and the like are favorable, and stable resistors can be easily obtained.

On the other hand, as the glass used as a component configuring the thick film resistor, mainly a glass containing lead oxide is used. The main reason of this is that the lead oxide-containing glass has a low softening point and has superior characteristics suitable for forming the thick film resistor, such as having favorable fluidity, wettability with the conductive component, superior adhesiveness to a substrate, and a coefficient of thermal expansion suitable for ceramics, particularly an alumina substrate.

However, the lead component possesses toxicity and is not desirable from the viewpoint of the effect on the human body and pollution. In order to deal with recent environmental problems, electronics products are required to comply with the Directive of WEEE (Waste Electrical and Electronic Equipment) and RoHS (Restriction of the Use of the Certain Hazardous Substances), and amid this situation, the development of a lead-free material is strongly required for the resistive compositions.

Furthermore, the lead component has very good wettability to alumina. Therefore, the lead component is wet and excessively spread over the alumina substrate at the time of firing, and the shape of the finally obtained resistor becomes an unintended shape in some cases.

Therefore, conventionally, some resistive compositions using, as a conductive component, bismuth ruthenate, alkaline earth metal ruthenate, or the like and using glass containing no lead have been proposed (see PTL (Patent Literature) 1 and PTL 2).

However, a thick film resistor using a lead-free glass and showing superior characteristics comparable with a conventional thick film resistor using lead-containing glass over a wide resistance value range has not been obtained yet. Especially, it has been difficult to form a resistor in a high resistance range of 100 k$\Omega$/□ or more. The reason of this is considered as follows.

Many of ruthenium composite oxides generally used in a high resistance range are prone to react with glass to decompose ruthenium dioxide having a lower resistivity than the ruthenium composite oxide at the time of firing the resistive composition at a high temperature. Especially when the ruthenium composite oxide is used in combination with glass containing no lead component, it is difficult to suppress the decomposition to ruthenium dioxide at the time of firing (for example, about 800° C. to 900° C.). Therefore, the resistance value is reduced, a desired high resistance value cannot be obtained, and further, there are problems of increasing the dependency on film thickness and the dependency on firing temperature.

By using a ruthenium composite oxide powder having a large particle size (for example, an average particle size of 1 μm or more) as described in PTL 1, the above-mentioned decomposition can be suppressed to a certain extent. However, in the case of using such a coarse conductive powder, the current noise and the load characteristics are deteriorated, and favorable resistance characteristics cannot be obtained.

In order to suppress the decomposition of bismuth ruthenate that is one of ruthenium composite oxides, using bismuth-based glass as described in PTL 2 in combination is effective. However, the TCR of a resistor obtained by the resistive composition of this combination becomes large in a negative direction in a high resistance range.

A fired film of a resistor was observed with an electron microscope by the inventors of the present invention, and a sign of forming a network (network structure) in which fine conductive particles are dispersed in a matrix of glass and are in contact with one another are observed. Therefore, it is considered that such a network becomes a conductive path, and thus, conductivity is shown.

In known resistive compositions using a combination of ruthenium composite oxide and lead-free glass, it is extremely difficult to stably form the above-mentioned network structure (hereinafter also referred to as a conductive network) especially in a high resistance range in which the content of conductive particles is small. Therefore, a thick film resistor containing no lead and being superior in various characteristics such as TCR characteristics, current noise characteristics, variations and the like has not become industrially applicable yet.

CITATION LIST

Patent Literatures

PTL 1: Japanese Patent Application Laid Open No. 2005-129806
PTL 2: Japanese Patent Application Laid Open No. H8-253342

SUMMARY OF INVENTION

Technical Problem

An object of the present invention is to provide a resistive composition that can form a thick film resistor excluding a toxic lead component from a conductive component and glass and having characteristics equivalent to or superior to conventional resistors in terms of, in a wide resistance range, resistance values, TCR characteristics, current noise characteristics, withstand voltage characteristics and the like.

Solution to Problem

In order to achieve the aforementioned object, the resistive composition of the present invention includes: ruthenium-based conductive particles including ruthenium dioxide; a glass frit that is essentially free of a lead component; and an organic vehicle, wherein as the glass frit, a glass frit is used, which is constituted such that in a case where a fired product of a mixture of the glass frit and the ruthenium dioxide has a value in a range of 1 kΩ/☐ to 1 MΩ/☐, the fired product exhibits a temperature coefficient of resistance in a plus range.

Advantageous Effects of Invention

According to the resistive composition of the present invention, although lead is not essentially contained, a resistor having characteristics that are equivalent to or superior to the conventional resistor can be formed over a wide resistance value range. Furthermore, the conductive component is not decomposed while firing, and thus, a uniform, stable conductive network can be formed in a glass matrix. Accordingly, a thick film resistor having no degradation in characteristics, a small process dependency on firing conditions and the like, and moreover a small variation and superior current noise characteristic in a high resistance range can be obtained.

The resistive composition of the present invention is extremely useful in producing a resistor in a medium resistance range to a high resistance range of 1 kΩ/☐ or more, particularly a resistor having a high resistance range of 100 kΩ/☐ or more.

DESCRIPTION OF EMBODIMENTS

Ruthenium-Based Conductive Particles

Figure 1A:
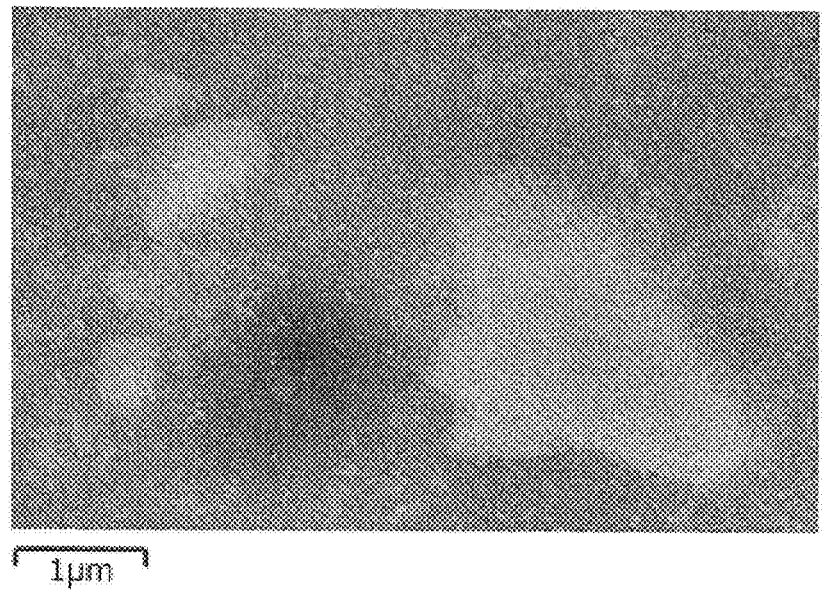
FIG. 1A is a drawing showing an SEM image obtained by analyzing a resistor produced using the resistive composition of the present invention by Scanning Electron Microscope/Energy Dispersive X-ray Spectrometry (SEM-EDX).

The ruthenium-based conductive particles in the present invention are preferably ruthenium-based conductive particles having 50 percent by mass or more of ruthenium dioxide ($RuO_2$), more preferably ruthenium-based conductive particles composed of only ruthenium dioxide ($RuO_2$). Thereby, the resistive composition of the present invention can provide a thick film resistor in which a stable conductive network is more easily formed, a variation is small, favorable resistance characteristics are obtained also in a high resistance range, and other electric characteristics and process stability are favorable, even after firing the resistive composition at high temperature, can be obtained.

The ruthenium-based conductive particles may be a mixture or a composite of ruthenium dioxide and other conductive particles described below.

Note that there is a case where the current noise characteristics are impaired when different kinds of conductive components are present together in the resistor. Therefore, in the present invention, it is preferable that the ruthenium-based conductive particles be essentially composed of only ruthenium dioxide.

Especially, it is preferable that the ruthenium-based conductive particles in the present invention be essentially free of a lead component and further essentially free of a bismuth component.

In the present invention, "be (or being) essentially composed of only" and "be (or being) essentially free of" allows "contain (or containing) a trace amount" of an unintended impurity, as represented by a case where the content of the impurity is 1000 ppm or less, whereas a case where the content of the impurity of 100 ppm or less is desired, in particular.

In the present invention, as the ruthenium-based conductive particles, using ruthenium-based conductive particles having fine particle size is desired. For example, a value at 50% in mass-based cumulative fractions of the particle size distribution measured by a laser particle size distribution measuring apparatus (hereinafter referred to as the average particle size $D_{50}$) is preferably in the range of 0.01 to 0.2 μm. By using such fine ruthenium-based conductive particles, the ruthenium-based conductive particles are favorably dispersed in a resistor fired film also in a high resistance range, a uniform and stable fine structure (conductive network) comprising the ruthenium-based conductive particles and glass is formed in the film, and a resistor having superior characteristics can be obtained.

When the average particle size $D_{50}$ of the ruthenium-based conductive particles is 0.01 μm or more, the reaction of the ruthenium-based conductive particles with the glass is easier to be suppressed and stable characteristics are obtained more easily. Furthermore, when the average particle size $D_{50}$ is 0.2 μm or less, current noise and load characteristics are prone to be easier to be improved. The ruthenium-based conductive particles particularly preferably have an average particle size $D_{50}$ of 0.03 to 0.1 μm.

Glass frit

In the present invention, as the glass frit, a glass frit is used, which is constituted such that when a fired product of a mixture of the glass frit and the ruthenium dioxide has a value in a range of 1 kΩ/☐ to 1 MΩ/☐, the temperature coefficient of resistance (TCR) of the fired product is in a plus range. The inventors of the present invention found that, in the case of using the glass frit having such characteristics, by adjusting the blending ratio between the ruthenium-based conductive particles and the glass frit to be added, adding an inorganic additives described below, as appropriate, and the like, the TCR can be small in a high resistance range of 100 k$\Omega$/□ or more. For example, the thick film resistor obtained by the resistive composition of the present invention can control the TCR within ±100 ppm/° C. in a wide resistance range of 100 $\Omega$/□ to 10 M$\Omega$/□.

The glass frit is preferably such a glass frit that the TCR of the fired product of the mixture of the glass frit and the ruthenium dioxide is more than 0 ppm/° C. and not more than 500 ppm/° C., preferably not more than 400 ppm/° C., more preferably not more than 300 ppm/° C. when the fired product shows a resistance value of 1 k$\Omega$/□ to 1 M$\Omega$/□.

The glass composition providing a positive TCR in a high resistance range preferably contains, in terms of oxide, 20 to 45 mol % of BaO, 20 to 45 mol % of $B_2O_3$, and 25 to 55 mol % of $SiO_2$.

When the content of BaO is 20 mol % or more, the TCR especially in a high resistance range can be in a plus range, and when the content of BaO is 45 mol % or less, the film shape after firing can be easily maintained in a good state.

When the content of $B_2O_3$ is 20 mol % or more, a dense fired film can be easily obtained, and when the content of $B_2O_3$ is 45 mol % or less, the TCR especially in a high resistance range can be in a plus range.

When the content of $SiO_2$ is 25 mol % or more, the film shape after firing can be easily maintained in a good state, and when the content of $SiO_2$ is 55 mol % or less, a dense fired film can be obtained more easily.

The glass frit more preferably contains, in terms of oxide, 23 to 42 mol % of BaO, 23 to 42 mol % of $B_2O_3$, and 35 to 52 mol % of $SiO_2$.

The glass transition point Tg of the glass frit is preferably in the range of 450° C. to 700° C. When the glass transition point Tg is 450° C. or more, a high resistance can be easily obtained, and when the glass transition point Tg is 700° C. or less, a dense fired film can be obtained. The Tg is preferably in the range of 580° C. to 680° C.

As to the relationship with the firing temperature at which the resistive composition is fired, the Tg is preferably (the firing temperature–200° C. or less, and in this case, the following formula (1) is established.

$$Tg \leq (\text{the firing temperature}-200)[° C.] \quad \text{formula (1)}$$

The average particle size $D_{50}$ of the glass frit is preferably 5 μm or less. When the $D_{50}$ is 5 μm or less, the resistance value in a high resistance range is easily adjusted, and when $D_{50}$ is too small, a void is prone to be generated in the resistor. The particularly preferable range of the $D_{50}$ is 0.5 to 3 μm.

The glass frit may further contain one or more kinds of components such as metal oxides that can adjust the TCR and other resistance characteristics, for example, ZnO, $Al_2O_3$, $Li_2O$, $Na_2O$, $K_2O$, $Nb_2O_5$, $Ta_2O_5$, $TiO_2$, CuO, $MnO_2$, and $La_2O_3$. These components can exert high effects even in a small amount. For example, these components can be contained in a total amount of about 0.1 to about 10 mol % in the glass frit, and the amount can be adjusted, as appropriate, according to the intended characteristics.

Functional filler

The resistive composition of the present invention preferably contains, in addition to the above-mentioned inorganic components, a functional filler (hereinafter also merely referred to as a filler).

The functional filler in the present invention is preferably composite particles obtained by providing glass particles having a low fluidity at the time of firing, separately from the above-mentioned glass frit, and causing conductive particles (hereinafter referred to as conducting particles), prepared separately from the above-mentioned ruthenium-based conductive particles, to adhere to and be fixed to the surfaces of the glass particles and inside the glass particles in the vicinity of the surfaces to form a composite. In the present invention, the term "glass frit" and the term "glass particles" are used distinctively from each other.

Further, in the present invention, the glass component derived from glass frit is also referred to as a "first glass component", and the glass component derived from the glass particles is also referred to as a "second glass component".

As the glass particles, glass particles having a low fluidity at the time of firing can be used regardless of their compositions. As an example, the glass particles are preferably a glass having a glass transition point Tg' of 500° C. or more, and especially a glass transition point Tg' higher than the above-mentioned glass transition point Tg of the glass frit (i.e., Tg<Tg' is established). Examples of the glass compositions having a high glass transition point Tg' include zinc borosilicate-based glass, lead borosilicate-based glass, alkaline earth metal borosilicate glasses such as barium borosilicate-based glass and calcium borosilicate-based glass, and the like. However, the present invention is not limited thereby.

In the relationship with the firing temperature of the resistive composition, Tg' is preferably (the firing temperature–150) ° C. or more, and in this case, the following formula (2) is established.

$$Tg' \leq (\text{the firing temperature}-150)[° C.] \quad \text{formula (2)}$$

As the conducting particles forming a composite with the glass particles in the functional filler, metal particles such as silver (Ag), gold (Au), platinum (Pt), palladium (Pd), copper (Cu), nickel (Ni), and aluminum (Al), etc., alloy particles containing these metals, and ruthenium-based conducting particles can be used.

Examples of the ruthenium-based conducting particles include, in addition to ruthenium dioxide, ruthenium composite oxides having a pyrochlore structure such as neodymium ruthenate ($Nd_2Ru_2O_7$), samarium ruthenate ($Sm_2Ru_2O_7$), neodymium calcium ruthenate ($NdCaRu_2O_7$), samarium strontium ruthenate ($SmSrRu_2O_7$), and related oxides thereof; ruthenium composite oxides having a perovskite structure such as calcium ruthenate ($CaRuO_3$), strontium ruthenate ($SrRuO_3$), and barium ruthenate ($BaRuO_3$); other ruthenium composite oxides such as cobalt ruthenate ($Co_2RuO_4$) and strontium ruthenate ($Sr_2RuO_4$); and mixtures thereof.

As the conducting particle, one or more kinds of the above-described examples can be used, and they may be used as a composite with a precursor compound such as silver oxide or palladium oxide.

As mentioned above, when different kinds of conductive components are present together in a resistor, the current noise characteristics are impaired in some cases. Therefore, as conducting particles that form a composite with glass particles in the functional filler, using ruthenium-based conducting particles containing, as a main component, ruthenium dioxide are particularly preferable.

As the conducting particles, using conducting particles having a fine particle size is desirable, and the average particle size $D_{50}$ in the range of 0.01 to 0.2 μm is preferable.

In the present invention, a method for producing the functional filler is not limited, and for example, the conducting particles may be deposited on the surfaces of the glass particles provided in advance by a well-known technique such as a displacement deposition method, an electroless plating method, or an electrolytic method, to form composite particles. In the present invention, the functional filler is desirably produced by so-called mechanochemical method in which glass particles and conducting particles provided in advance are stirred and mixed by a known stirring means such as a media mill or the like, and the mixture is subjected to thermal treating (for example, at 850° C. to 900° C.) and thereafter pulverizing, to fix the conducting particles on the surfaces and/or inside thereof.

According to such a method, composite particles having a disperse structure in which conducting particles having a small particle size are adhered to/fixed to the surfaces of glass particles having a relatively large particle size and inside the glass particles in the vicinity of the surfaces can be easily produced.

With the resistive composition according to the present invention, the TCR and the other resistance characteristics can be adjusted easily. Thus, by containing the functional filler, a resistor having a small variation in resistance value and stability in a high resistance range and improved in characteristics such as withstand voltage characteristics, electrostatic characteristics, and a change in resistance value can be obtained, although a favorable resistor can also be obtained using inorganic additives described below.

The average particle size $D_{50}$ of the filler is desirably in the range of 0.5 to 5 µm. When the average particle size $D_{50}$ is 0.5 µm or more, a dense fired film is obtained more easily, and when the average particle size $D_{50}$ is 5 µm or less, the withstand voltage characteristics are less prone to be deteriorated. Especially, the average particle size $D_{50}$ of 1 to 3 µm is preferable.

The average particle size $D_{50}$ of the filler can be controlled by adjusting the pulverizing conditions in the case where the filler is produced by the above-described mechanochemical method, for example.

The content of the conducting particles contained in the filler is preferably 20 to 35 percent by mass relative to the filler. When the content is 20 percent by mass or more, the resistance value of the thick film resistor obtained after firing can be adjusted/controlled easily. When the content is 35 percent by mass or less, good STOL characteristics (withstand voltage characteristics) can be obtained.

As shown in Example 1 described below with reference to FIG. 1A to FIG. 10, in the case where glass particles which are essentially free of a lead component are contained, and moreover the glass transition point Tg of glass frit is (the firing temperature–200)° C. or less and the glass transition point Tg' of the glass particles is (the firing temperature–150)° C. or more, then the glass in the resistor forms a sea-island structure. This sea-island structure is a structure in which glass (first glass component) derived from the glass frit forms sea (matrix), and glass (second glass component) derived from the glass particles forms islands. Such a structure is formed not only in the case of addition of the functional filler as a component of a resistive composition, but also in the case of using glass particles instead of the functional filler. Such a structure is a structure that is not found in a conventional resistor.

Other additives

In the resistive composition according to the present invention, one or a combination of various inorganic additives generally used for the purpose of improving and adjusting resistance characteristics such as TCR, current noise, ESD characteristics, and STOL may be added in a range in which the effect of the present invention is not impaired. Examples of the additives include $Nb_2O_5$, $Ta_2O_5$, $TiO_2$, CuO, $MnO_2$, ZnO, $ZrO_2$, $La_2O_3$, $Al_2O_3$, $V_2O_5$, and glass (hereinafter referred to as additive glass, the "additive glass" is a glass component different from the first glass component and the second glass component). By blending such additives, a resistor having better characteristics throughout a wide resistance value range can be produced. The amount of the additives to be added is adjusted, as appropriate, according to the purpose of the use and, for example in the case of a metal oxide-based additive such as $Nb_2O_5$, the amount is generally about 0.1 to about 10 parts by mass relative to 100 parts by mass of a total inorganic solid content in a resistive composition. In the case of adding the additive glass, more than 10 parts by mass of the additive glass is added in some cases.

Organic vehicle

In the present invention, by mixing the ruthenium-based conductive particles and glass frit with an organic vehicle together with the functional filler and/or additives blended if necessary, a resistive composition in a form of paste, paint, or ink, having rheology suitable for a method to which the resistive composition is applied, such as screen printing, is formed.

The organic vehicle is not limited to particular organic vehicles and the vehicle generally used in resistive compositions may be used, examples of which include solvents such as terpineol (hereinafter referred to as TPO), carbitol, butyl carbitol, cellosolve, butylcellosolve, esters thereof, toluene, and xylene; and a solution obtained by dissolving a resin such as ethylcellulose, nitrocellulose, acrylic acid ester, methacrylic acid ester, or rosin in the solvent. A plasticizer, a viscosity modifier, a surfactant, an oxidant, a metal organic compound, and the like may also be added if necessary.

The amount of the organic vehicle to be blended may be in a range generally blended in a resistive composition and can be adjusted, as appropriate, according to an application method such as printing for forming a resistor. 50 to 80 percent by mass of inorganic solid and 50 to 20 percent by mass of organic vehicle are preferable.

Resistive composition

The resistive composition in the present invention is produced by mixing and kneading the ruthenium-based conductive particles and glass frit, and the functional filler and/or an additive to be added if necessary, with an organic vehicle and uniformly dispersing them in accordance with a usual method.

The composition in the present invention is not limited to be in a form of paste and the composition may also be in a form of paint or ink.

Production of resistor

According to an ordinary procedure, the resistive composition of the present invention is printed/applied by a printing method or the like in a predetermined pattern onto an object to be printed, such as an insulating substrate such as an alumina substrate or a glass ceramics substrate or a laminate electronic component, dried, and then fired at a high temperature of, for example, about 600° C. to 900° C. A protective film is generally formed on the thick film resistor thus formed by baking an overcoat glass, and the resistance value is adjusted by laser trimming or the like if necessary.

As a distribution form of the resistive composition as a product, a combination of two or more kinds of resistive compositions that form resistors having different resistance values is sold and distributed as a set in many cases.

The resistive composition of the present invention is suitable for this, and by providing two or more kinds of resistive compositions of the present invention as a set, a resistive composition that can form a resistor having a desired resistance value, by blending a plurality of the resistive compositions, as appropriate, by a user can be prepared. Accordingly, a wide resistance range can be covered by the plurality of resistive compositions having similar compositions.

EXAMPLES

The present invention is described in further detail below with reference to the examples. The present invention, however, is not limited by these examples.

The physical properties of samples prepared in the examples were measured by the following measurement devices and measurement methods.

Rs (Sheet resistance)

The sheet resistance was measured using a digital multimeter "3458A" manufactured by Agilent Technologies, Inc. and was converted to the value of a fired film thickness of 8 μm. 20 samples were subjected to the measurement, and an average thereof was calculated.

TCR

TCR between +25° and +125° C. (H-TCR) and TCR between −55 and +25° C. (C-TCR) were measured using the digital multimeter. 20 samples were subjected to the measurements, and averages thereof were calculated.

Tog, tag', TMA

A thermomechanical analyzer "TMA4000S" manufactured by Bruker AXES K.K. was used. 20 samples were subjected to the measurement, and an average thereof was calculated.

STOL

The resistance value change rate after applying 2.5 times of ¼W rated voltage (the maximum of 400 V) for 5 seconds was measured. 20 samples were subjected to the measurement, and an average thereof was calculated.

Average particle size $D_{50}$

A laser diffraction/scattering type particle size distribution analyzer "LA950V2" manufactured by HORIBA, Ltd. was used. 20 samples were subjected to the measurement, and an average thereof was calculated.

<Preliminary Experiment A>

Firstly, experiments for obtaining a glass frit in which, in the case where a fired product of a mixture of the glass frit and ruthenium dioxide has a value in a range of 1 kΩ/□ to 1 MΩ/□, the fired product exhibits a temperature coefficient of resistance in a plus range were performed.

Experimental Examples 1 to 42

Glass frits each having the glass composition as shown in Table 1 and having an average particle size $D_{50}$ of 2 μm were produced and used as samples 1 to 42.

Subsequently, ruthenium dioxide (manufactured by Shoei Chemical Inc., product name: Ru-109, an average particle size $D_{50}$=0.05 μm) provided separately from the samples and each of the samples 1 to 42 were mixed so as to have a mass ratio of 20:80. Thereafter, a composition obtained by adding 30 parts by mass of an organic vehicle to 100 parts by mass of each of the mixtures was kneaded with three rolls. Thus, pastes of experimental examples 1 to 42 corresponding to the samples 1 to 42 respectively were produced. As the organic vehicle, an organic vehicle obtained by mixing 15 parts by mass of ethylcellulose and TPO as a solvent at an amount of the balance was used.

A 1 mm×1 mm pattern was printed on an alumina substrate onto which silver thick film electrodes had been baked in advance, using each paste, then subjected to leveling at room temperature for 10 minutes, dried at 150° C. for 10 minutes, and thereafter fired at 850° C. (peak temperature) for 60 minutes in the atmosphere. Thus, fired patterns of experimental examples 1 to 42 corresponding to the samples 1 to 42 were obtained.

The resistance values Rs of the fired patterns were measured, and the TCR between +25° C. and +125° C. (hereinafter referred to as H-TCR) and the TCR between −55° C. and +25° C. (hereinafter referred to as C-TCR) of the fired patterns having resistance values of about 1 kΩ/□ and 1 kΩ/□ or more were measured.

The measurement results are shown in Table 1.

In Table 1, as to the samples having Rs of less than 1 kΩ/□, the measurements of the H-TCR and the C-TCR were omitted, and the sign "−" is indicated in the table.

As to the samples 11, 13, 30, 38, 39, and 41 used in the experimental examples 11, 13, 30, 38, 39, and 41 in which the H-TCR and the C-TCR were in the plus ranges among the experimental examples 1 to 42, pastes each having a mass ratio of ruthenium dioxide and each sample of 10:90 were produced in the same manner as mentioned above, and fired patterns were obtained.

Thereafter, in the same manner as mentioned above, the resistance values Rs of the respective patterns were measured, and the H-TCR and the C-TCR of the patterns except for patterns whose resistance values could not be measured, were measured. The results are shown in Table 1.

TABLE 1

| Experimental example No. | Glass frit Sample No. | Composition [mol %] | | | | | | | | | | |
|---|---|---|---|---|---|---|---|---|---|---|---|---|
| | | $SiO_2$ | PbO | $B_2O_3$ | $Al_2O_3$ | CaO | ZnO | MgO | BaO | $Na_2O$ | $K_2O$ | $Li_2O$ |
| Experimental example 1 | Sample 1 | 3.4 | 12.9 | 24.5 | — | — | 59.2 | — | — | — | — | — |
| Experimental example 2 | Sample 2 | 3.4 | 4.0 | — | 0.3 | — | 92.4 | — | — | — | — | — |
| Experimental example 3 | Sample 3 | 8.7 | 11.6 | 23.3 | 0.5 | — | 55.2 | — | 0.7 | — | — | — |
| Experimental example 4 | Sample 4 | 9.2 | — | 25.6 | 8.6 | 1.4 | 53.2 | — | 2.0 | — | — | — |
| Experimental example 5 | Sample 5 | 10.4 | — | 31.5 | 2.2 | — | 55.8 | — | — | — | — | — |

TABLE 1-continued

| Experimental example | Sample | | | | | | | | | | | |
|---|---|---|---|---|---|---|---|---|---|---|---|---|
| Experimental example 6 | Sample 6 | 10.9 | — | 24.3 | 0.1 | — | 57.7 | 7.0 | — | — | — | — |
| Experimental example 7 | Sample 7 | 11.5 | 2.9 | 26.0 | — | — | 59.5 | — | 0.2 | — | — | — |
| Experimental example 8 | Sample 8 | 22.0 | — | 29.3 | 3.2 | — | 25.3 | — | 3.6 | 16.6 | — | — |
| Experimental example 9 | Sample 9 | 36.7 | 24.0 | 34.8 | 2.2 | — | — | — | — | 0.8 | 1.6 | — |
| Experimental example 10 | Sample 10 | 37.6 | 37.7 | 11.9 | 1.1 | — | 6.2 | — | — | 5.5 | — | — |
| Experimental example 11 | Sample 11 | 39.4 | 8.0 | 22.7 | 7.4 | 9.9 | — | 3.2 | 9.0 | 0.5 | — | — |
| Experimental example 12 | Sample 12 | 40.2 | 30.4 | 8.6 | 0.7 | — | 7.8 | — | — | 5.8 | 6.5 | — |
| Experimental example 13 | Sample 13 | 43.6 | — | 27.9 | — | — | — | — | 28.5 | — | — | — |
| Experimental example 14 | Sample 14 | 47.3 | — | 35.4 | 7.5 | — | — | — | 9.5 | 0.2 | — | — |
| Experimental example 15 | Sample 15 | 49.0 | 15.2 | 7.3 | 6.4 | 15.9 | 5.8 | 0.4 | — | — | — | — |
| Experimental example 16 | Sample 16 | 49.1 | 49.1 | — | 0.5 | 0.6 | — | 0.1 | — | 0.3 | 0.2 | — |
| Experimental example 17 | Sample 17 | 51.9 | 33.1 | 14.6 | 0.3 | — | — | — | — | — | — | — |
| Experimental example 18 | Sample 18 | 53.2 | 25.8 | 14.9 | 4.7 | — | — | — | — | — | 1.5 | — |
| Experimental example 19 | Sample 19 | 54.2 | 17.4 | 9.9 | 8.0 | — | 7.6 | — | 0.5 | — | 2.4 | — |
| Experimental example 20 | Sample 20 | 55.2 | 15.6 | 11.5 | 1.9 | 15.5 | — | 0.2 | — | 0.2 | 0.1 | — |
| Experimental example 21 | Sample 21 | 55.3 | — | — | 6.2 | 1.9 | 16.1 | — | 20.5 | — | — | — |
| Experimental example 22 | Sample 22 | 56.1 | — | 20.3 | 1.8 | 10.2 | 2.8 | — | — | 7.5 | 1.3 | — |
| Experimental example 23 | Sample 23 | 56.5 | — | 6.4 | 4.0 | 6.3 | 15.2 | — | 11.6 | — | — | — |
| Experimental example 24 | Sample 24 | 57.5 | 9.1 | 12.4 | 7.5 | 10.2 | — | — | — | 3.3 | — | — |
| Experimental example 25 | Sample 25 | 57.7 | 18.5 | 11.9 | 2.7 | 0.3 | 5.1 | — | — | 1.7 | 2.2 | — |
| Experimental example 26 | Sample 26 | 58.0 | 21.2 | 13.5 | 2.9 | — | 3.0 | — | — | — | 1.4 | — |
| Experimental example 27 | Sample 27 | 58.6 | 5.0 | 2.5 | 4.6 | 15.7 | — | — | 9.9 | 2.6 | 1.0 | — |
| Experimental example 28 | Sample 28 | 58.7 | 8.1 | 0.1 | 4.7 | 9.5 | 1.1 | — | 13.6 | 2.9 | 1.2 | — |
| Experimental example 29 | Sample 29 | 59.1 | 9.9 | 1.8 | 6.8 | 19.7 | 2.2 | 0.4 | — | — | — | — |
| Experimental example 30 | Sample 30 | 59.8 | 0.2 | — | 5.0 | 18.3 | 2.6 | 0.2 | — | 9.4 | 4.5 | — |
| Experimental example 31 | Sample 31 | 60.2 | 0.1 | 14.5 | 3.0 | 5.6 | 3.7 | — | 1.4 | 9.2 | 2.3 | — |
| Experimental example 32 | Sample 32 | 61.4 | 20.9 | 14.2 | 3.4 | — | — | — | — | — | — | — |
| Experimental example 33 | Sample 33 | 62.7 | 34.3 | 1.5 | 0.6 | — | — | — | — | 0.8 | 0.1 | — |
| Experimental example 34 | Sample 34 | 63.0 | 7.1 | 10.1 | 7.3 | 10.5 | 1.8 | 0.2 | — | — | — | — |
| Experimental example 35 | Sample 35 | 63.7 | 15.9 | 16.6 | 3.8 | — | — | — | — | — | — | — |
| Experimental example 36 | Sample 36 | 64.4 | 29.2 | — | 3.9 | — | 0.1 | — | — | 1.3 | 1.2 | — |
| Experimental example 37 | Sample 37 | 71.8 | 0.3 | — | 3.7 | 0.2 | 3.4 | 4.7 | — | 15.6 | 0.3 | — |
| Experimental example 38 | Sample 38 | 74.2 | — | — | 2.0 | — | — | — | 5.2 | 0.4 | 18.3 | — |
| Experimental example 39 | Sample 39 | 76.2 | — | — | 2.0 | — | — | — | 4.6 | 7.0 | 4.9 | 5.3 |
| Experimental example 40 | Sample 40 | 80.9 | — | — | 2.1 | — | — | — | 4.8 | 7.1 | 5.1 | — |
| Experimental example 41 | Sample 41 | 82.3 | — | 16.0 | 0.1 | — | — | 0.2 | — | — | 1.4 | — |
| Experimental example 42 | Sample 42 | 84.8 | — | — | 2.6 | — | — | — | 4.3 | 8.3 | — | — |

TABLE 1-continued

| Experimental example No. | Ru-based particles/Glass frit (mass ratio) = 20/80 | | | Ru-based particles/Glass frit (mass ratio) = 10/90 | | |
|---|---|---|---|---|---|---|
| | Rs ($\Omega/\square$) | H-TCR (ppm/° C.) | C-TCR (ppm/° C.) | Rs ($\Omega/\square$) | H-TCR (ppm/° C.) | C-TCR (ppm/° C.) |
| Experimental example 1 | 0.465k | — | — | — | — | — |
| Experimental example 2 | 20.9k | −162 | −155 | — | — | — |
| Experimental example 3 | 0.827k | — | — | — | — | — |
| Experimental example 4 | 28.0k | −43 | −33 | — | — | — |
| Experimental example 5 | 40.2k | −445 | −460 | — | — | — |
| Experimental example 6 | 9.78k | −195 | −199 | — | — | — |
| Experimental example 7 | 1.49k | −48 | −49 | — | — | — |
| Experimental example 8 | 0.709k | — | — | — | — | — |
| Experimental example 9 | 0.211M | −95 | −166 | — | — | — |
| Experimental example 10 | 90.4k | −177 | −218 | — | — | — |
| Experimental example 11 | 1.17k | 280 | 269 | 0.187M | −77 | −73 |
| Experimental example 12 | 0.215k | — | — | — | — | — |
| Experimental example 13 | 7.66k | 165 | 147 | 0.877M | 73 | 70 |
| Experimental example 14 | 8.87k | −47 | −42 | — | — | — |
| Experimental example 15 | 89.3k | −144 | −201 | — | — | — |
| Experimental example 16 | 0.248M | −134 | −223 | — | — | — |
| Experimental example 17 | 0.789M | −172 | −228 | — | — | — |
| Experimental example 18 | 0.713M | −198 | −278 | — | — | — |
| Experimental example 19 | 0.146M | −278 | −347 | — | — | — |
| Experimental example 20 | 0.332M | −95 | −201 | — | — | — |
| Experimental example 21 | 0.331k | — | — | — | — | — |
| Experimental example 22 | 9.03k | −20 | −59 | — | — | — |
| Experimental example 23 | 21.4k | 9 | −7 | — | — | — |
| Experimental example 24 | 55.7k | −82 | −145 | — | — | — |
| Experimental example 25 | 0.298M | −199 | −286 | — | — | — |
| Experimental example 26 | 45.7k | −139 | −219 | — | — | — |
| Experimental example 27 | 0.474k | — | — | — | — | — |
| Experimental example 28 | 0.866k | — | — | — | — | — |
| Experimental example 29 | 0.181M | −143 | −177 | — | — | — |
| Experimental example 30 | 6.84k | 158 | 115 | ∞ | — | — |
| Experimental example 31 | 13.9k | −178 | −225 | — | — | — |
| Experimental example 32 | 0.148M | −245 | −301 | — | — | — |
| Experimental example 33 | 0.362M | −253 | −347 | — | — | — |
| Experimental example 34 | 0.372M | −231 | −287 | — | — | — |
| Experimental example 35 | 0.252M | −199 | −243 | — | — | — |
| Experimental example 36 | 0.360M | −218 | −309 | — | — | — |
| Experimental | 0.653k | — | — | — | — | — |

TABLE 1-continued

| | | | | | | |
|---|---|---|---|---|---|---|
| Experimental example 37 | | | | | | |
| Experimental example 38 | 26.7k | 305 | 371 | ∞ | — | — |
| Experimental example 39 | 20.3k | 221 | 200 | ∞ | — | — |
| Experimental example 40 | 3.14M | 22 | −31 | — | — | — |
| Experimental example 41 | 50.4k | 415 | 655 | ∞ | — | — |
| Experimental example 42 | 0.255M | −524 | −545 | — | — | — |

As shown in Table 1, in the preliminary experiment A, only the sample 13 among the samples 1 to 42 showed that all of TCRs were in the plus range.

In order to analyze in further detail, glass frits having compositions containing, as main components, $SiO_2$, $B_2O_3$, and BaO as in the sample 13 (samples 43 to 50 in Table 2) were newly provided, and pastes having mass ratios of ruthenium dioxide and each glass frit of 30:70, 20:80, and 10:90 were produced. Subsequently, a fired pattern was obtained using each paste, and the glass transition point Tg and coefficient of thermal expansion α, and the resistance value Rs, H-TCR, and C-TCR of the fired pattern were measured.

Furthermore, in order to evaluate the denseness of the surface of the fired film, the fired surface of each pattern was observed by visual check, and the pattern in which unevenness (convexconcave) was clearly observed on the surface was indicated by "x", and the patterns in which unevenness was slightly observed were indicated by "Δ", and the patterns in which unevenness was hardly observed were indicated by "○".

The results are shown in Table 2.

TABLE 2

| Experimental example No. | Glass frit Sample No. | Glass composition [mol %] | | | Ru-based particles/Glass frit (mass ratio) | | | | | |
|---|---|---|---|---|---|---|---|---|---|---|
| | | | | | 30/70 | | | 20/80 | | |
| | | $SiO_2$ | $B_2O_3$ | BaO | Rs (Ω/□) | H-TCR (ppm/°C.) | C-TCR (ppm/°C.) | Rs (Ω/□) | H-TCR (ppm/°C.) | C-TCR (ppm/°C.) |
| Experimental example 13 | Sample 13 | 43.6 | 27.9 | 28.5 | 0.953k | 260 | 143 | 7.66k | 165 | 147 |
| Experimental example 43 | Sample 43 | 30.0 | 30.0 | 40.0 | 18.2k | 126 | 91 | 0.442M | 109 | 59 |
| Experimental example 44 | Sample 44 | 30.0 | 35.0 | 35.0 | 3.96k | 201 | 192 | 95.6k | 75 | 46 |
| Experimental example 45 | Sample 45 | 30.0 | 40.0 | 30.0 | 1.73k | 215 | 188 | 25.3k | 67 | 31 |
| Experimental example 46 | Sample 46 | 41.0 | 26.0 | 33.0 | 11.9k | 150 | 131 | 0.447M | 112 | 82 |
| Experimental example 47 | Sample 47 | 45.0 | 31.0 | 24.0 | 1.02k | 232 | 221 | 21.0k | 57 | 33 |
| Experimental example 48 | Sample 48 | 50.0 | 15.0 | 30.0 | 0.530k | 349 | 339 | 5.62k | −130 | 100 |
| Experimental example 49 | Sample 49 | 50.0 | 25.0 | 25.0 | 0.678k | 375 | 353 | 18.0k | 129 | 109 |
| Experimental example 50 | Sample 50 | 50.0 | 35.0 | 15.0 | 0.664k | 235 | 223 | 10.4k | 22 | −28 |

| Experimental example No. | Ru-based particles/Glass frit (mass ratio) 10/90 | | | Tg (°C.) | Coefficient of thermal expansion α (×10$^{-7}$/°C.) | Denseness of fired surface |
|---|---|---|---|---|---|---|
| | Rs (Ω/□) | H-TCR (ppm/°C.) | C-TCR (ppm/°C.) | | | |
| Experimental example 13 | 1.02M | 73 | 70 | 629.7 | 82.3 | ○ |
| Experimental example 43 | 12.5M | 216 | 152 | 603.0 | 94.0 | Δ |
| Experimental example 44 | 5.53M | 122 | 84 | 620.5 | 85.5 | Δ |
| Experimental example 45 | 2.72M | 48 | 4 | 625.5 | 76.6 | Δ |
| Experimental example 46 | 10.5M | 191 | 155 | 620.5 | 91.8 | ○ |
| Experimental example 47 | 2.10M | 58 | 7 | 631.0 | 71.4 | ○ |

TABLE 2-continued

| | | | | | | |
|---|---|---|---|---|---|---|
| Experimental example 48 | 15.7M | −840 | −866 | 654.0 | 93.2 | X |
| Experimental example 49 | 12.2M | 82 | 44 | 661.0 | 73.1 | ◯ |
| Experimental example 50 | 2.22M | −41 | −89 | 628.0 | 62.2 | Δ |

As can be seen from the results shown in Table 2, it can be said that the glass frits of the samples 13, 43, 44, 45, 46, 47, and 49 used in the experimental examples 13, 43, 44, 45, 46, 47, and 49 are glass frits which each provide a fired product of the mixture of the glass frit and the ruthenium dioxide showing a temperature coefficients of resistance in a plus range when the fired product has a value in a range of 1 k$\Omega$/□ to 1 M$\Omega$/□.

The examples described below show examples of producing resistors from resistive compositions that contain the glass frit of the sample 13.

<Preliminary Experiment B>

Subsequently, preliminary experiments for a functional filler for improving characteristics such as withstand voltage characteristics, electrostatic characteristics, a change in resistance value were performed.

As a glass having a low fluidity at the time of firing, glass particles (average particle size $D_{50}$=2 μm, $T_g'$=713° C.) containing, in terms of oxide, 76.4 mol % of $SiO_2$, 3.3 mol % of $B_2O_3$, 6.5 mol % of $Al_2O_3$, 11.1 mol % of CaO, 1.2 mol % of MgO, 0.3 mol % of $La_2O_3$, 1.1 mol % of $K_2O$, and 0.1 mol % of $ZrO_2$ were provided.

Ruthenium dioxide (Ru-109) was provided as conducting particles contained in a filler, and the above glass particles and the conducting particles were mixed so that the contents of the conducting particles in the filler were 20 percent by mass, 30 percent by mass, and 40 percent by mass, each of the mixtures was stirred with a ball mill using a media having a diameter of 5 mm and alcohol as a solvent, and thereafter, the mixture was subjected to a thermal treatment at 880° C. The mixture was again pulverized with the above-mentioned ball mill so that the average particle size $D_{50}$ of the filler became 3 μm, and three kinds of fillers were produced.

When each resultant filler was observed with a scanning electron microscope (SEM), a structure in which particles of ruthenium dioxide having a relatively small particle size (0.05 μm) were adhered/dispersed on the surfaces of the glass particles having a relatively large particle size (about 3 μm) and inside the glass particles in the vicinity of the surfaces was observed.

Each of these fillers and the glass frit of the sample 13 were mixed so as to have mass ratios of 50:50, 40:60, and 30:70, and fired patterns were produced in the same manner as in the preliminary experiment A.

Furthermore, each of these fillers, ruthenium dioxide (Ru-109), and the glass frit of the sample 13 were mixed so as to have mass ratios of 45:5:50, 35:5:60, and 25:5:70, and fired patterns were produced in the same manner as mentioned above.

The resistance values Rs and STOL of each of these patterns were measured. The results are shown in Table 3.

In Table 3, as to the patterns in which it was difficult to perform measurements of STOL because the resistance values were high and unstable, the measurements were omitted, and the sign "−" is shown in Table 3.

TABLE 3

| | | | Filler/Glass frit (mass ratio) | | | Filler/Ru-based particles/ Glass frit (mass ratio) | | |
|---|---|---|---|---|---|---|---|---|
| | | | 50/50 | 40/60 | 30/70 | 45/5/50 | 35/5/60 | 25/5/70 |
| Content of Ru-based particles in filler (percent by mass) | 20 | Rs (Ω/□) | ∞ | ∞ | ∞ | 18.9M | 27.3M | 33.0M |
| | | STOL (%) | — | — | — | — | — | — |
| | 30 | Rs (Ω/□) | 5.28M | 51.5M | ∞ | 574k | 1.30M | 2.91M |
| | | STOL (%) | −0.91 | 0.28 | — | −0.59 | −0.27 | −0.33 |
| | 40 | Rs (Ω/□) | 274k | 1.19M | 5.58M | 89.5k | 411k | 1.07M |
| | | STOL (%) | −2.19 | −0.59 | −0.09 | −3.19 | −0.64 | −0.23 |

As shown in Table 3, when the content of the conducting particles in the filler was 20 percent by mass, the conduction was not obtained by only using the filler, and the conduction was obtained by adding a small amount of ruthenium dioxide. On the other hand, when the content was 40 percent by mass, the STOL became excessively large and thus such a content was not suitable for practical use.

The above-described results demonstrate that, in the present invention, the content of the conducting particles in the filler is preferably in the range of 20 to 35 percent by mass.

Example 1

The present example is an example in the case of containing a functional filler as a component of a resistive composition.

Examples 1-1 to 1-6

Compositions obtained by blending ruthenium dioxide (Ru-109), the filler having a content of conducting particles of 30 percent by mass, produced in the preliminary experiment B, and a glass frit of the sample 13, produced in the preliminary experiment A, in amounts of the parts by mass shown in Table 4 and adding 30 parts by mass of an organic vehicle were kneaded with three rolls. Thus, pastes of Examples 1-1 to 1-6 were produced. As the organic vehicle, an organic vehicle obtained by mixing 15 parts by mass of ethylcellulose and the balance of TPO was used.

A 1 mm×1 mm pattern was printed on an alumina substrate onto which silver thick film electrodes had been baked in advance, using each paste, then subjected to leveling at room temperature for 10 minutes, dried at 150° C. for 10 minutes, and thereafter fired at 850° C. (peak temperature) for 60 minutes in the atmosphere. Thus, resistors were obtained.

The sheet resistance value Rs, H-TCR, C-TCR, variation CV in resistance value, noise, and STOL of each resistor were measured. The CV was determined from the values measured for 20 resistors.

The measurements results are shown in Table 4.

In Table 4, as to the resistors, the noise of which was difficult to measure because of overrange, the measurement was omitted, and the sign "–" is shown in Table 4.

Moreover, the resistance value Rs set as a target value for each paste is also shown in Table 4 as a reference.

TABLE 4

| Composition ratio | Example | | | | | |
|---|---|---|---|---|---|---|
| | 1-1 | 1-2 | 1-3 | 1-4 | 1-5 | 1-6 |
| | Target Rs (Ω/□) | | | | | |
| (parts by mass) | 100 | 1k | 10k | 100k | 1M | 10M |
| Ru-based particles | 50.0 | 28.5 | 16.5 | 10.5 | 6.0 | 3.0 |
| Filler | 0.0 | 20.5 | 24.5 | 26.5 | 28.0 | 29.0 |
| Glass frit | 50.0 | 51.0 | 59.0 | 63.0 | 66.0 | 68.0 |
| Measured Rs (Ω/□) | 99.3 | 1.08k | 10.5k | 107k | 1.09M | 9.87M |
| H-TCR (ppm/° C.) | 8 | –6 | 13 | –9 | 35 | 56 |
| C-TCR (ppm/° C.) | –20 | –2 | 11 | –25 | 7 | 27 |
| CV (%) | 3.4 | 2.4 | 1.8 | 2.4 | 2.8 | 7.1 |
| Noise (dB) | –25 | –19 | –11 | –2 | +9 | — |
| STOL (%) | 0 | 0 | –0.07 | –0.27 | –0.12 | –0.02 |

As can be seen from Table 4, according to the present invention, resistors having superior current noise characteristics and load characteristics in a whole wide resistance range (100Ω/□ to 10 MΩ/□) could be obtained, and especially, a TCR within ±100 ppm/° C. could be achieved.

Figure 1B:
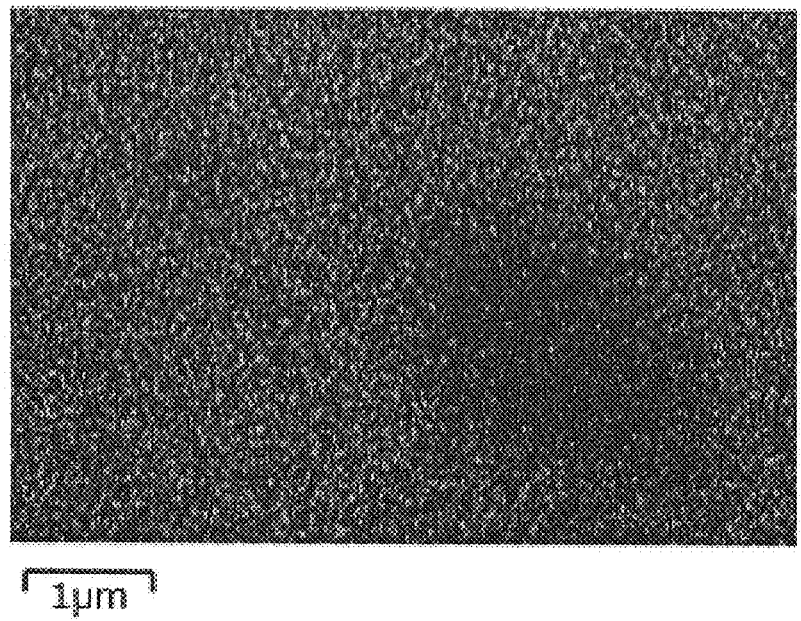
FIG. 1B is a drawing showing a result of mapping the SEM image with respect to a Ba element.
Figure 1C:
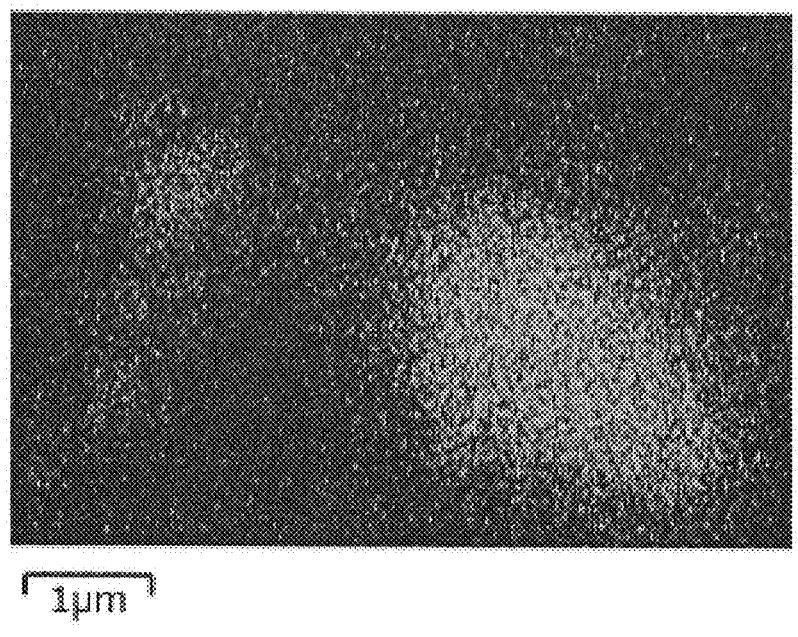
FIG. 1C is a drawing showing a result of mapping the SEM image with respect to a Ru element.

Furthermore, the results of analysis of the resultant resistor by Scanning Electron Microscope/Energy Dispersive X-ray Spectrometry (SEM-EDX) is shown in FIG. 1A to FIG. 1C. FIG. 1A is an SEM image of the resistor. FIG. 1B is a drawing showing a result of mapping with respect to Ba element, and FIG. 1C is a drawing showing a result of mapping image with respect to Ru element.

As shown in FIG. 1B, in the resistor obtained in Example 1, a plurality of discontinuous parts (hereinafter referred to as islands) containing no Ba are scattered in a continuous region (hereinafter referred to as a matrix) containing Ba, and a so-called sea-island structure was found.

The glass frit used in this Example 1 contained Ba, whereas the glass particles used as a filler contained no Ba. Therefore, it is assumed that, in the resistor of the present invention, the glass particles having low fluidity at the time of firing remain in the matrix of the glass frit so as to form islands, and thus, such a sea-island structure was formed. Moreover, as shown in FIG. 1C, the presence of Ru on the surfaces of the glass particles at a high concentration was found. Therefore, it is assumed that $RuO_2$ particles are not uniformly dispersed in the resistor obtained from the resistive composition of the present invention, and at least a part of the resistor has a soap foam-like non-uniform network structure.

Example 2

The present example is an example in the case where a resistive composition contains no functional filler.

Examples 2-1 to 2-6

As a glass frit having a composition close to the sample 13, sample 51 (in terms of oxide, 38.1 mol % of $SiO_2$, 26.1 mol % of $B_2O_3$, 27.2 mol % of BaO, 0.8 mol % of $Al_2O_3$, 0.5 mol % of SrO, 3.6 mol % of ZnO, 3.2 mol % of $Na_2O$, and 0.5 mol % of $K_2O$) was newly provided. The Tg of the sample 51 was 629.4° C.

Additive glass was added to the paste for the purpose of adjusting the TCR. As the additive glass, an additive glass (in terms of oxide, 43.0 mol % of $SiO_2$, 18.2 mol % of $B_2O_3$, 13.0 mol % of $Al_2O_3$, 2.8 mol % of CaO, 3.2 mol % of MgO, 1.3 mol % of $SnO_2$, 1.9 mol % of $Co_2O_3$, 6.6 mol % of $K_2O$, and 10.0 mol % of $Li_2O$) was provided. The glass transition point of the additive glass was 494.0° C.

Compositions obtained by blending ruthenium dioxide (Ru-109), the additive glass, and the glass frit of the sample 51 in amounts of the parts by mass shown in Table 5 and adding 30 parts by mass of an organic vehicle and the parts by mass of the other additives shown in Table 5 were kneaded with three rolls. Thus, pastes were produced. As the organic vehicle, an organic vehicle obtained by mixing 15 parts by mass of ethylcellulose and the balance of TPO was used.

A 1 mm×1 mm pattern was printed on an alumina substrate onto which silver thick film electrodes had been baked in advance, using each paste, then subjected to leveling at room temperature for 10 minutes, dried at 150° C. for 10 minutes, and thereafter fired at 850° C. (peak temperature) for 60 minutes in the atmosphere. Thus, resistors were obtained.

The sheet resistance value Rs, H-TCR, C-TCR, variation CV in resistance value, and noise of each resistor were measured.

The measurement results are shown in Table 5.

TABLE 5

| Composition ratio | Example | | | | | |
|---|---|---|---|---|---|---|
| | 2-1 | 2-2 | 2-3 | 2-4 | 2-5 | 2-6 |
| | Target Rs (Ω/□) | | | | | |
| (parts by mass) | 100 | 1k | 10k | 100k | 1M | 10M |
| Ru-based particles | 50.0 | 33.3 | 22.5 | 17.1 | 11.7 | 10.4 |
| Additive glass | 40.0 | 28.0 | 20.0 | 16.0 | 12.0 | 11.0 |

TABLE 5-continued

| Composition ratio | Example | | | | | |
|---|---|---|---|---|---|---|
| | 2-1 | 2-2 | 2-3 | 2-4 | 2-5 | 2-6 |
| | Target Rs ($\Omega/\square$) | | | | | |
| (parts by mass) | 100 | 1k | 10k | 100k | 1M | 10M |
| Glass frit | 10.0 | 38.7 | 57.5 | 66.9 | 76.3 | 78.6 |
| Other additives (outer addition) | | | | | | |
| $MnO_2$ | 0.60 | | | | | |
| $Nb_2O_5$ | 0.13 | 0.18 | 0.10 | 0.06 | 0.02 | 0.01 |
| $Ta_2O_5$ | | 0.50 | 0.50 | 0.50 | 0.50 | 0.50 |
| CuO | | | 0.20 | 0.30 | 0.40 | 0.40 |
| Measured Rs ($\Omega/\square$) | 93.4 | 1.09k | 9.07k | 99.0k | 1.09M | 9.00M |
| H-TCR (ppm/° C.) | 8 | −22 | 17 | −18 | 4 | 15 |
| C-TCR (ppm/° C.) | −30 | −28 | 16 | −33 | −17 | −19 |
| CV (%) | 6.69 | 5.24 | 0.85 | 4.71 | 4.07 | 10.29 |
| Noise (dB) | −27 | −21 | −11 | −5 | 11 | — |

As can be seen from Table 5, the present invention could cause the TCR within 100 ppm/° C. in a wide resistance range even in the case of containing no functional filler.

Example 3

The same experiments as in the preliminary experiments A and B and Examples 1 and 2 were performed except that the ruthenium-based conductive particles to be used were changed to each of ruthenium dioxide (manufactured by Shoei Chemical Inc., Product name: Ru-108) having an average particle size $D_{50}$=0.20 μm and ruthenium dioxide (manufactured by Shoei Chemical Inc., Product name: Ru-105) having $D_{50}$=0.02 μm. Almost the same results were obtained.

The invention claimed is:

1. A resistive composition comprising: ruthenium-based conductive particles including ruthenium dioxide; a glass frit that is essentially free of a lead component; an organic vehicle and a functional filler, wherein the glass frit is a glass frit which is constituted such that in a case where a fired product of a mixture of the glass frit and the ruthenium dioxide has a value in a range of 1 k$\Omega/\square$ to 1 M$\Omega/\square$, the fired product exhibits a temperature coefficient of resistance in a plus range and wherein the functional filler is composite particles comprising glass particles which are essentially free of a lead component and conducting particles which have a smaller particle size than the glass particles and are essentially free of a lead component.

2. The resistive composition according to claim 1, wherein the glass frit comprises, in terms of oxide, 20 to 45 mol % of BaO, 20 to 45 mol % of $B_2O_3$, and 25 to 55 mol % of $SiO_2$.

3. The resistive composition according to claim 1, wherein the ruthenium-based conductive particles have an average particle size $D_{50}$ of 0.01 to 0.2 μm.

4. The resistive composition according to claim 1, wherein the glass particles have a glass transition point Tg' satisfying a relationship of Tg<Tg' with respect to a glass transition point Tg of the glass frit.

5. The resistive composition according to claim 4, wherein the Tg is in a range of 450° C. to 700° C. and the Tg' is 500° C. or more.

6. The resistive composition according to claim 1, wherein the functional filler contains the conducting particles in an amount of 20 to 35 percent by mass.

7. The resistive composition according to claim 1, wherein the conducting particles are ruthenium-based conducting particles containing ruthenium dioxide.

8. The resistive composition according to claim 1, wherein the conducting particles have an average particle size $D_{50}$ of 0.01 to 0.2 μm.

9. The resistive composition according to claim 1, wherein the functional filler has an average particle size $D_{50}$ of 0.5 to 5 μm.

10. A resistive composition set comprising a combination of two or more resistive compositions described in claim 1, wherein the resistive compositions have different weight amounts of the ruthenium-based conductive particles and glass frit.

* * * * *